United States Patent [19]

Ishikawa

[11] Patent Number: 5,455,690
[45] Date of Patent: Oct. 3, 1995

[54] IMAGE READING APPARATUS

[75] Inventor: Yuji Ishikawa, Yokohama, Japan

[73] Assignee: Canon Kabushiki Kaisha, Tokyo, Japan

[21] Appl. No.: 203,487

[22] Filed: Feb. 28, 1994

Related U.S. Application Data

[63] Continuation of Ser. No. 682,460, Apr. 9, 1991, abandoned.

[30] Foreign Application Priority Data

Apr. 12, 1990 [JP] Japan .................... 2-95108

[51] Int. Cl.⁶ .............. H04N 1/40; H04N 1/04
[52] U.S. Cl. ........................... 358/461; 358/488
[58] Field of Search .................. 358/461, 488, 358/462, 464, 496, 498, 406, 504, 505, 528

[56] References Cited

U.S. PATENT DOCUMENTS

| | | |
|---|---|---|
| 4,717,963 | 1/1988 | Koizumi . |
| 4,760,464 | 7/1988 | Sakano .................... 358/461 |
| 4,870,501 | 9/1989 | Yoshida . |
| 4,907,097 | 3/1990 | Sobue .................... 358/461 |
| 5,124,810 | 6/1992 | Seto ..................... 358/474 |

FOREIGN PATENT DOCUMENTS

| | | |
|---|---|---|
| 56-084066 | 7/1981 | Japan . |
| 60-130256 | 7/1985 | Japan .................... 358/488 |
| 61-065660 | 4/1986 | Japan . |
| 63-048960 | 3/1988 | Japan . |
| 1277054 | 11/1989 | Japan . |

*Primary Examiner*—Wing F. Chan
*Assistant Examiner*—Ping W. Lee
*Attorney, Agent, or Firm*—Fitzpatrick, Cella, Harper & Scinto

[57] ABSTRACT

An image reading apparatus for photoelectrically reading an image (e.g. as used in facsimile apparatus, digital copying machines, etc.) includes a reference member provided at a reading position within the image reading apparatus; a reading device for reading, at the reading position, an image of at least one of (i) an original document and (ii) the reference member, and for generating image data representative of the read image; a memory unit for previously storing as reference data, data obtained by reading the reference member with the reading device; a correcting device for correcting image data obtained by reading an original document with the reading device; using the reference data stored in the memory unit; a discriminating device for discriminating whether the original document is present at the reading position by comparing position data, obtained by reading the image at the reading position, with the reference data stored in the memory unit; and a control unit for controlling the memory unit to store the position data to replace the reference data, when the discriminating device discriminates that the original document is not present at the reading position.

37 Claims, 6 Drawing Sheets

IMAGE READING APPARATUS

This application is a continuation of application Ser. No. 07/682,460 filed Apr. 9, 1991, which is now abandoned.

BACKGROUND OF THE INVENTION

1. Field of the Invention

The present invention relates to an image reading apparatus for photoelectrically reading an image used for facsimile apparatus, digital copying machines, etc.

2. Description of the Related Art

An image reading apparatus, which converts an image into an electric signal for output, is used in order to transmit to a remote place and store an image on an original document.

Such an image reading apparatus is generally so constructed that an image on an original document to be read is transferred from a specified loading position to a reading position, the image on the original document is exposed by a light source such as a fluorescent lamp at the reading position, and a reflected light from the original document is converted into an electric signal by an image sensor such as a CCD line sensor.

Also in the image reading apparatus, an electrical process of shading correction is performed to remove an ununiform level in an image signal which is caused by an ununiform quantity of light from a light source, ununiform sensitivity of the image sensor and characteristics of an optical system such as a lens and a mirror.

To perform shading correction for a read signal in an image reading apparatus, a light volume distribution data for the above light source has been conventionally sampled. For this light volume distribution data, a reference plane, such as a white background, provided near a reading position is read in accordance with a detection that an original document has reached a position before the reading position, prior to reading an image on the original document, and data read from the reference plane is used. When a plurality of original documents are automatically fed continuously, the current position of the original document is checked to read the above reference plane immediately before each original document is fed to the reading position.

When, however, an oblique original has been conveyed, or an original at an angle, detection of the position to sample data for the above-mentioned shading correction has been delayed and as a result, there was a defect in a conventional apparatus that one part of the end of the original is erroneously read as the reference plane.

To eliminate such a defect, it may be considered to greatly delay the timing for sampling the light volume distribution data from the reference plane and the timing of arriving at the reading position for original documents by prolonging the conveyance interval of a plurality of original documents. In this case, however, a new defect occurs that it will take more time to read the entire plurality of original documents.

It has been proposed in commonly assigned U.S. Pat. Nos. 4,717,963 and 4,870,501 a configuration whereby shading correction is performed for image data in accordance with the presence of an original at a reading position.

In these documents, however, the presence of an original at a reading position is detected by using sensors such as a microswitch.

SUMMARY OF THE INVENTION

Thus, it is an object of the present invention to provide an image reading apparatus capable of satisfactorily reading an image on an original document.

It is a further object of the present invention to provide an image reading apparatus capable of reading a good image for an original document even if a portion of the original document is read in a timing for obtaining data for correction without delaying a reading time for the fed original document.

It is also an object of the present invention to provide an image reading apparatus which does not require ceasing from reading an image, but is capable of continuing to read the image, and does not deteriorate the read image for the original document even if a data for correction cannot be obtained due to improper conveyance of the original document.

It is another object of the present invention to provide an image reading apparatus capable of controlling in accordance with the presence of an original document at a reading position without necessity of providing an exclusive sensor for detecting the presence of the original document.

The above-mentioned and other objects and effects of the present invention will appear more fully from the following description.

DETAILED DESCRIPTION OF THE PREFERRED EMBODIMENTS

The present invention will hereinafter be described in detail referring to preferred embodiments.

Figure 1:
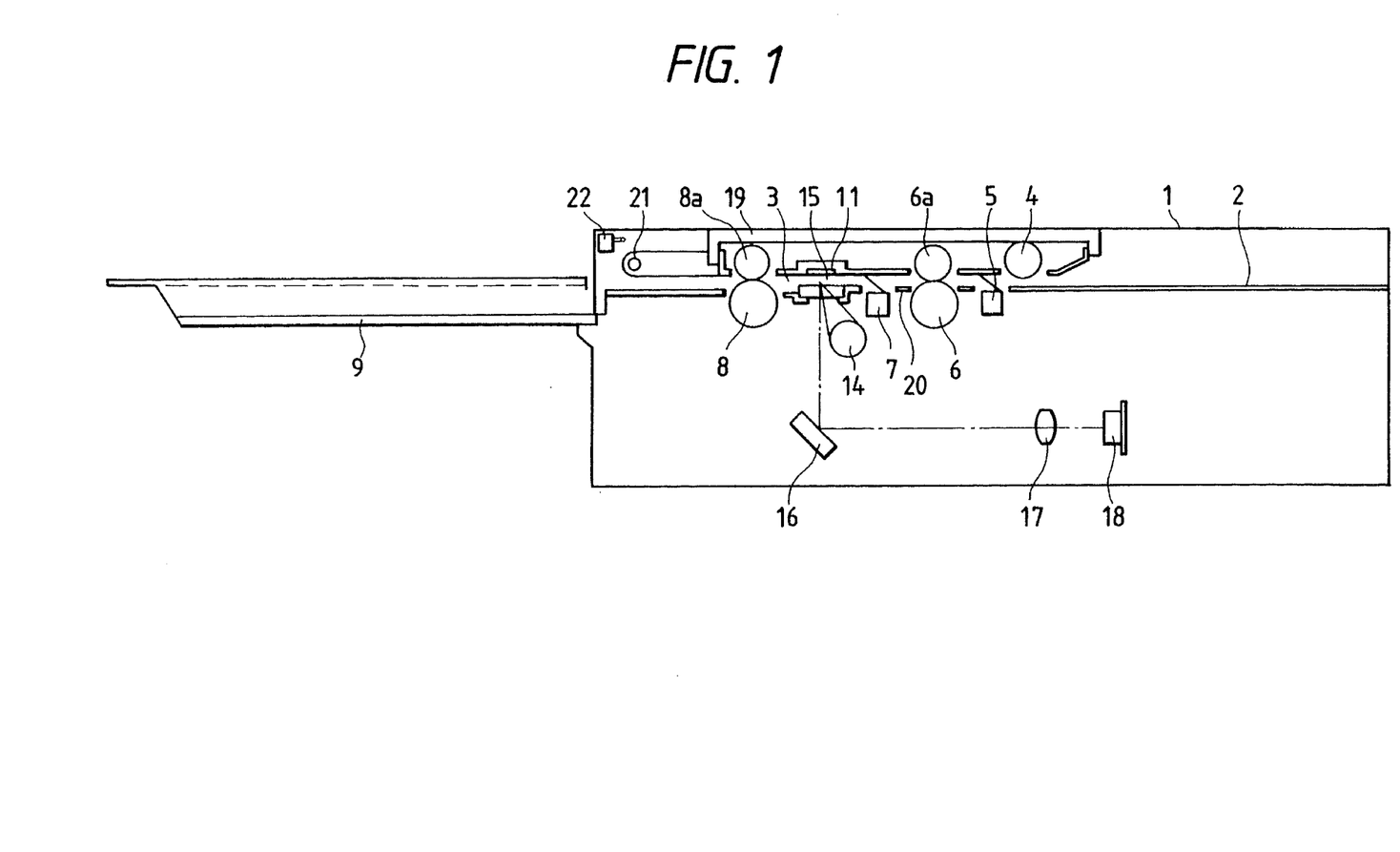
FIG. 1 shows a configuration of an image reading apparatus according to the present invention.

FIG. 1 is a block diagram showing a configuration of an image reading apparatus according to the present invention.

In FIG. 1, numeral 1 is the apparatus main body, numeral 2 is an original loading stand, and a conveyance path 3 for an original document in cut sheet format is formed on an extension line. Along this conveyance path 3, the following are disposed in order from the upstream side: a pick-up roller 4 for conveying an original document in cut sheet format, a microswitch 5 which operates by a minute force to detect the presence of the sheet original, a pair of conveyor rollers 6 and 6a, a microswitch 7 which operates by a minute force to detect the front and rear ends of the original, a pair of conveyance rollers 8 and 8a, and an exit paper tray 9 for the sheet original.

A fluorescent lamp 14, a light source for lighting an original, irradiates an original conveyed to a reading position 15, and its reflected light is input into a solid image pickup element (CCD) 18 comprising a plurality of light receiving elements, which have been linearly arranged, through a mirror 16 and a lens 17 to read an image on the original for each line for scanning. An uniform white reference plane 11 is provided at the reading position 15.

The conveyance path 3 is composed of a guide unit 19 and a guide member 20, and is so constructed that it can be opened from above at the reading position 15 for the original. That is, the guide unit 19 is rotatably mounted round a fulcrum 21 on the apparatus main body, and opening the conveyance path 3 turns on a microswitch 22 to allow the opening of the conveyance path 3 to be detected.

The operation of an image reading apparatus constructed as mentioned above will be described.

While the guide unit 19 is closed, that is, the conveyance path 3 is closed, one or a plurality of sheet originals are placed on the original loading stand 2, and a start switch provided at a console is operated, and then the presence of the sheet original will be detected by the microswitch 5. When the sheet original is detected by the microswitch 5, a solenoid is turned on, and the pickup roller is pressed against the sheet original to convey it in the upstream direction, to the left as viewed in FIG. 1.

The front end of the lowest one of a plurality of sheet originals is held between the conveyance rollers 6 and 6a, and when the sheet original is detected by the microswitch 7, the solenoid is turned off to release the pressing force on the pickup roller 4.

When the solenoid is turned off and the pressing force on the pickup roller 4 is released, the above-mentioned driving motor is driven for a number of steps, SA, to convey the sheet original only for a distance A between the microswitch 7 and the reading position 15. When the front end of the sheet original reaches the reading position 15, reading of the original image starts. When the fluorescent lamp 14 lights the sheet original and its reflected light forms an image on the CCD 18 through the mirror 16 and the lens 17, the reading is performed by converting the image into an electric signal for each line by means of the CCD 18.

When the rear end of the sheet original reaches the reading position 15 to complete reading thereafter, the motor is driven only for a number of steps, SB, equivalent to a distance B between the reading position 15 and the conveyance rollers 8 and 8a to exhaust, or exits the sheet original onto the tray 9. The reading operation for the sheet original is now completed.

Figure 2:
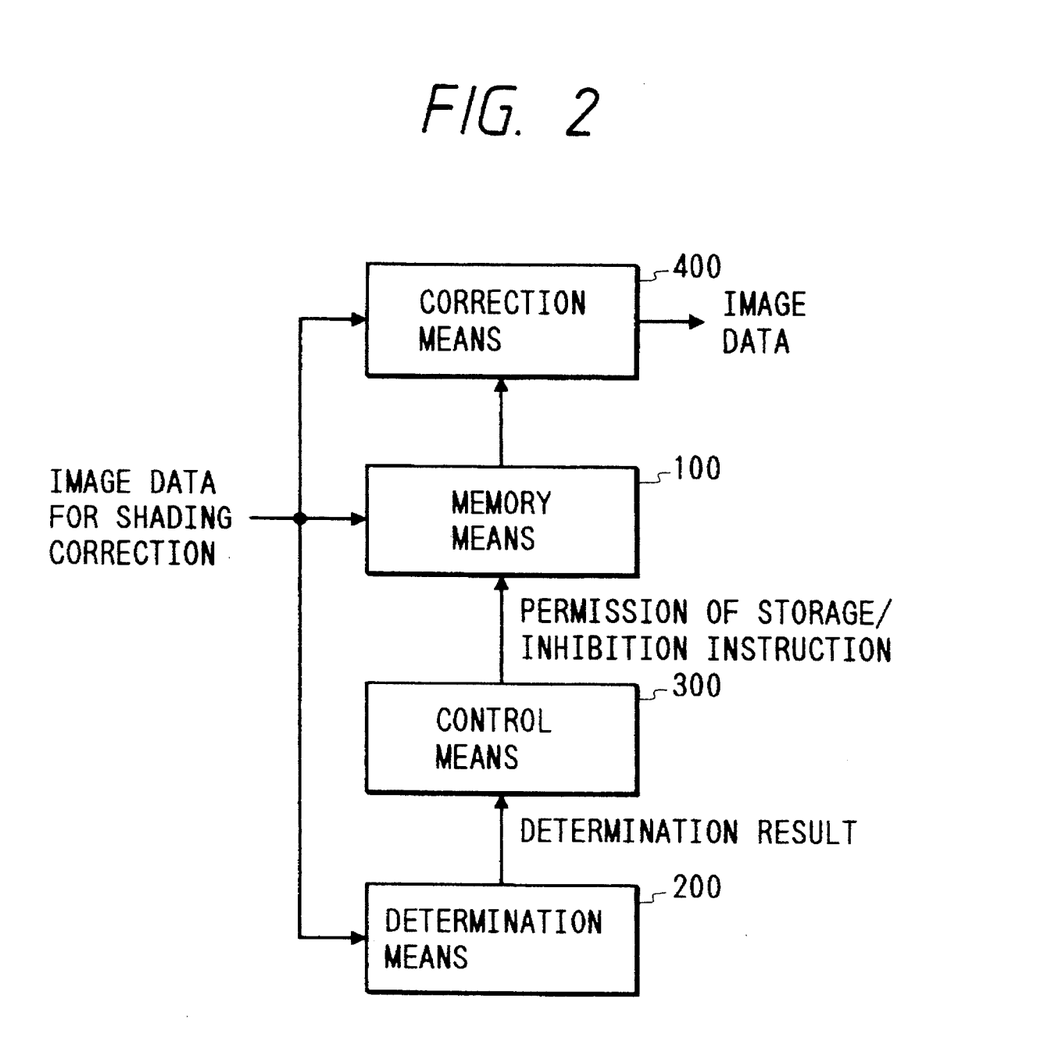
FIG. 2 is a block diagram showing a configuration concerning shading correction.

FIG. 2 shows a basic configuration concerning shading correction for an image reading apparatus shown in FIG. 1.

In an image reading apparatus according to an embodiment of the present invention, a white background image on a reference plane 11 provided beforehand is read, and shading correction is performed using the read reference data before reading the original image.

In FIG. 2, memory means 100 stores the abovementioned read image data for one line for shading correction.

Determination means 200 compares and determines whether or not more than a predetermined number of black pixel data exist in the above-mentioned read image data for one line.

When the determination result of the determination means 200 is affirmative, control means 300 inhibits the memory means 100 from updating the memory with the read image data. When the determination result of the determination means 200 is negative, control means 300 permits the memory means 100 to update the memory with the read image data.

Correction means 400 performs shading correction for a read image signal for an original image in accordance with an image data for shading correction stored in the above memory means 100.

Figure 3:
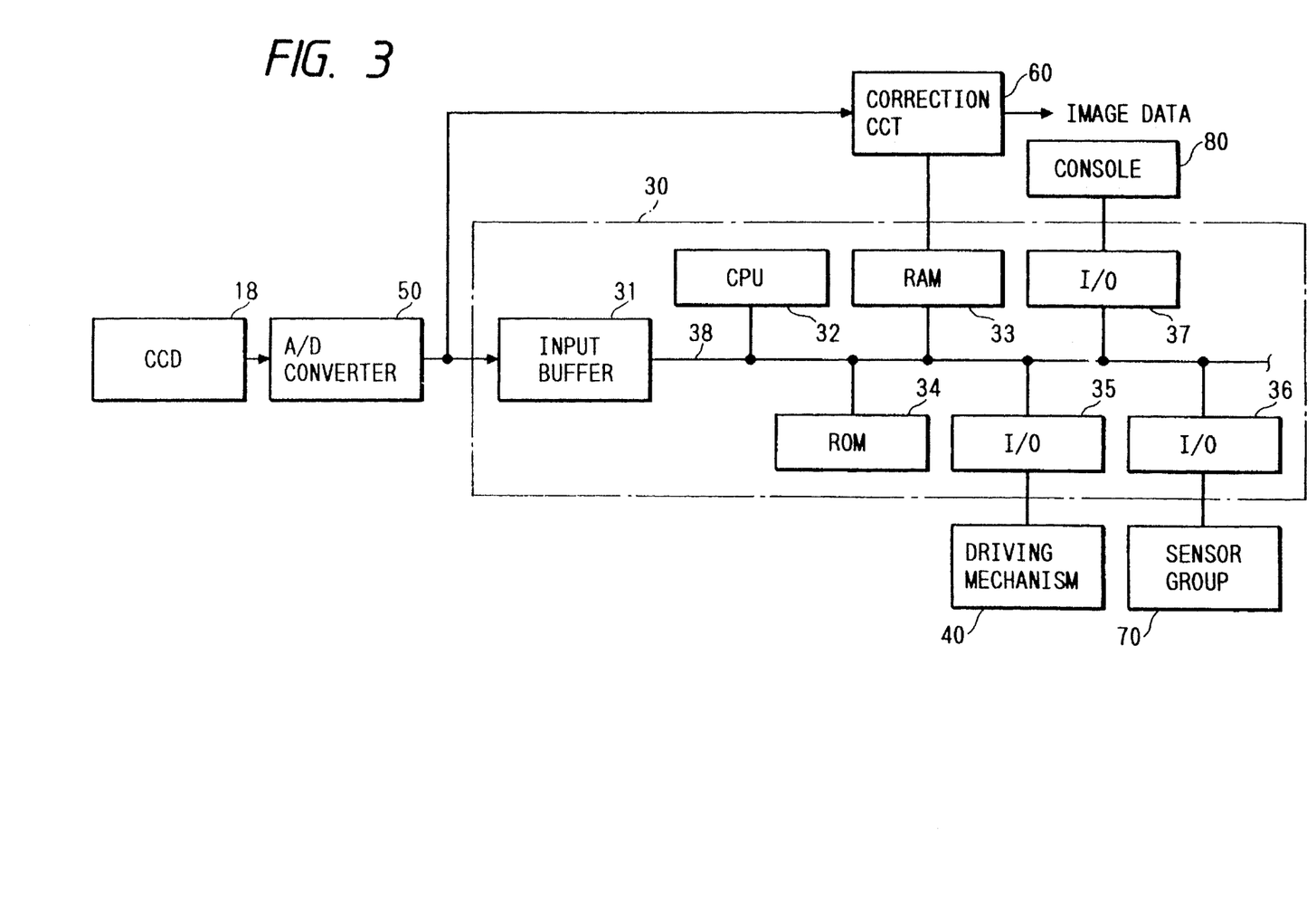
FIG. 3 is a block diagram showing a circuit configuration.

FIG. 3 shows a circuit configuration according to an embodiment of the present invention.

An image signal photoelectrically converted by the solid image pickup element (CCD) 18 is input into a control unit 30 and correction circuit 60 after being converted into a digital signal by an analog-digital (A/D) converter 50.

The control unit 30 controls a driving mechanism 40 to control the movement of an original, turning on and off of a light source (a fluorescent lamp 14), conveyance of the original and the like for the reading scan of the CCD 18.

The detailed description of the driving mechanism 40 is omitted because a conventional, wellknown mechanism can be used.

In the control unit 30, an input buffer 31, a central processing unit (CPU) 32, a random access memory (RAM) 33, a read-only memory (ROM) 34, and an interface (I/O) 35 to 37 are commonly connected to a bus 38.

An input buffer 31 receives a read data from the CCD 18 through the A/D converter 50 to temporarily store a data for one line. This read data is a white background image on a reference plane 11 used for shading correction.

The CPU 32 processes the following in addition to controlling the entire apparatus.

1) The CPU 32 transfers a read data of CCD 18 for the reference plane 11 to RAM 33 through the input buffer 31 to correct shading, and hereafter performs shading correction using this image data. At this time, the CPU 32 determines the presence of the end of an original to decide whether or not the read data has been stored in the RAM 33. Accordingly, RAM 33 operates as memory means 100 in FIG. 2, and CPU 32 operates as determination means 200 and control means 300.

2) In the same way as in a conventional example, the CPU 32 gives an operation instruction to the driving mechanism 40 in accordance with an input from the console 80 and a sensor group 70, conveys the original and reads the image to output the read image data to the outside.

A RAM 33 stores, for retention, a read image data for shading correction, a general operation result of the CPU 32 and information on state of operation of the driving mechanism 40 in accordance with a read/write instruction by the CPU 32. Also an image data for shading correction, which has been read out from the RAM 33, is fed into a correction circuit 60, which performs shading correction for an original image data from the A/D converter 50. Accordingly the correction circuit 60 operates as the correction means 400 in FIG. 2.

Figures 4, 4A:
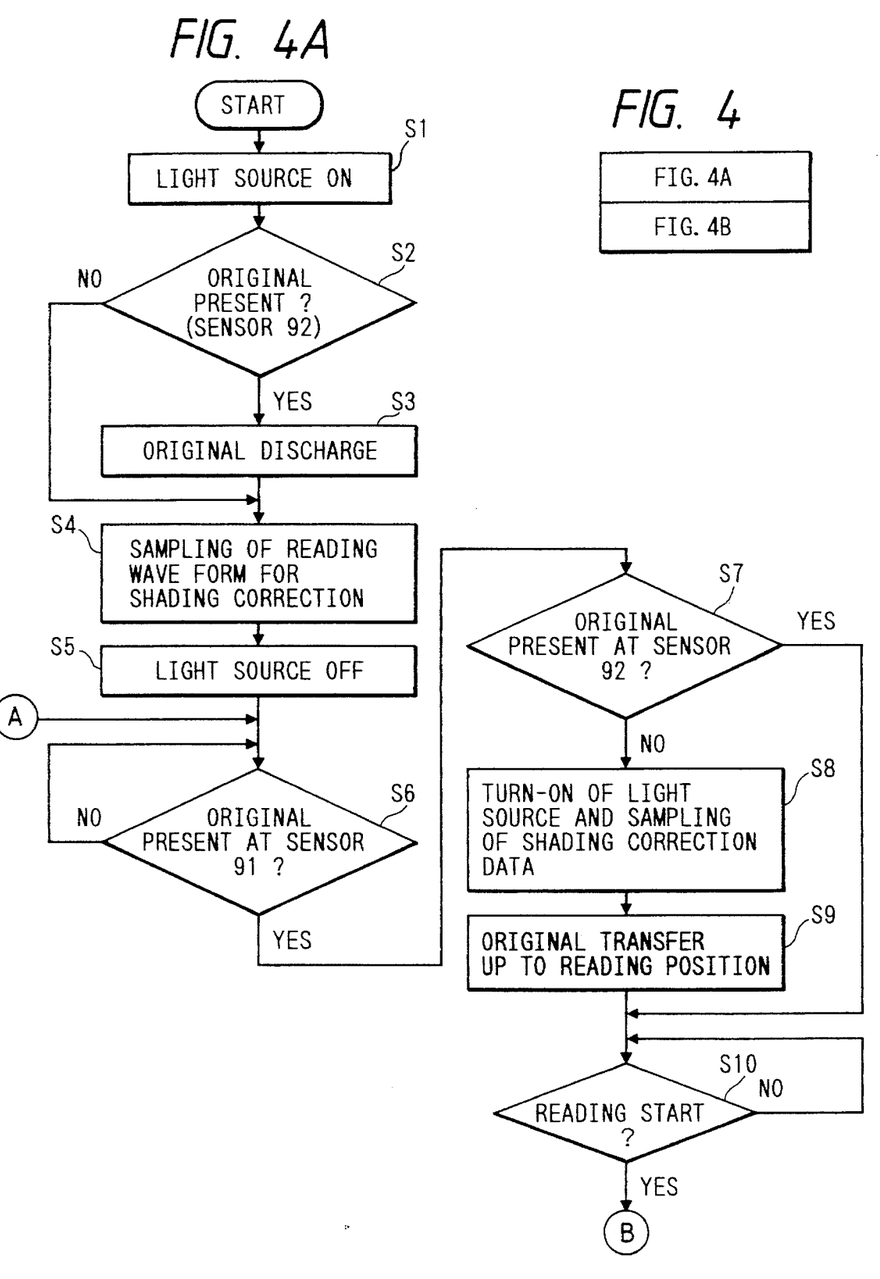
FIGS. 4 to 4B is a flow chart showing a control procedure to be executed by a CPU 32 in FIG. 3.
Figure 4B:
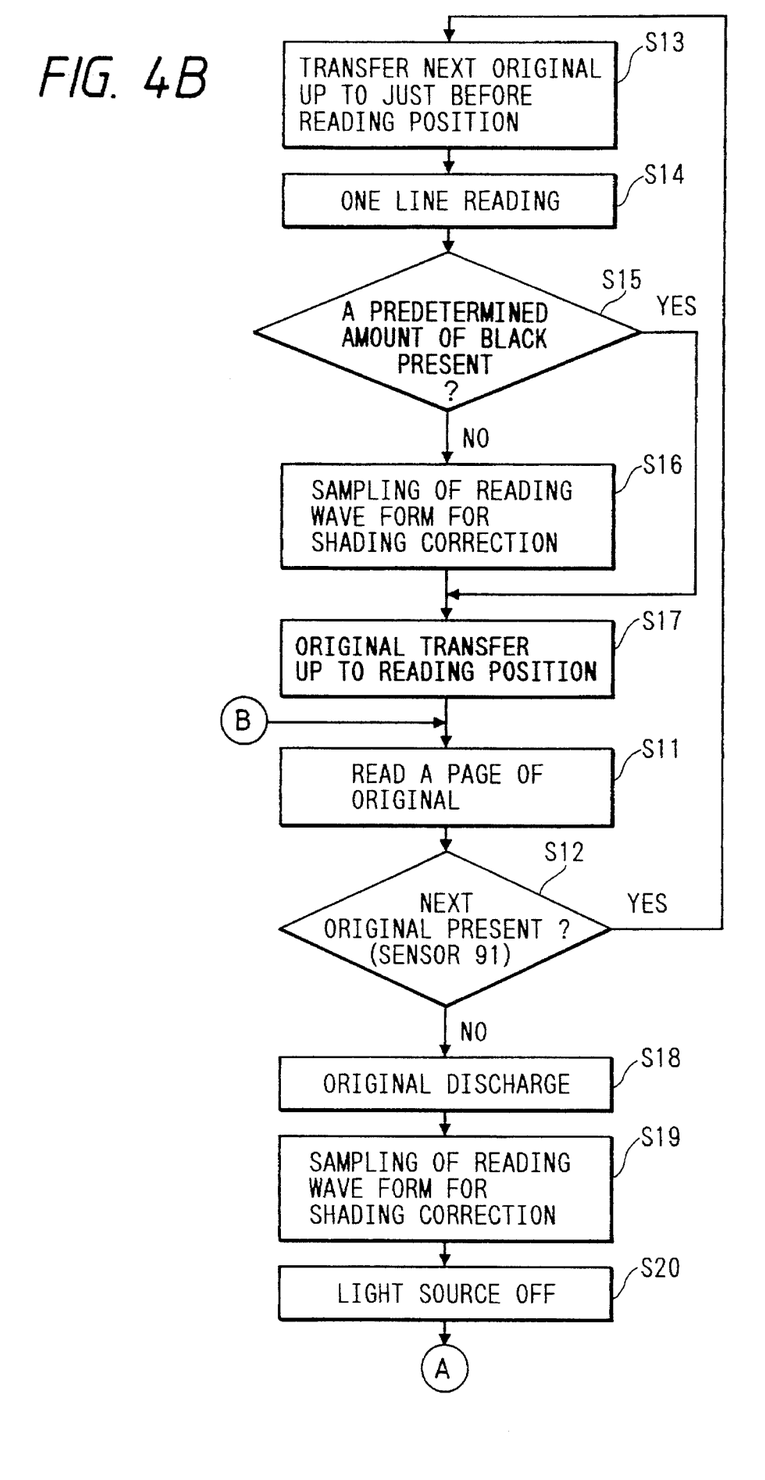

Previously stored is a ROM is conventionally wellknown control program whereby the above process is performed by the CPU 32, and the control program in which the control procedure shown in FIG. 4 has been described.

A I/O 36 transfers a signal from the sensor group 70 such as a detection signal for positions of each component and an original to the CPU 32, and a I/O 35 transfers an operation instruction by the CPU 32 such as a motor drive/stop instruction and a light source ON/OFF instruction to the driving mechanism 40.

A I/O 37 transfers a key input signal from a console 80 to the CPU 32, and also transfers a display signal from the CPU 32 to a display of the console 80.

Figure 5A:
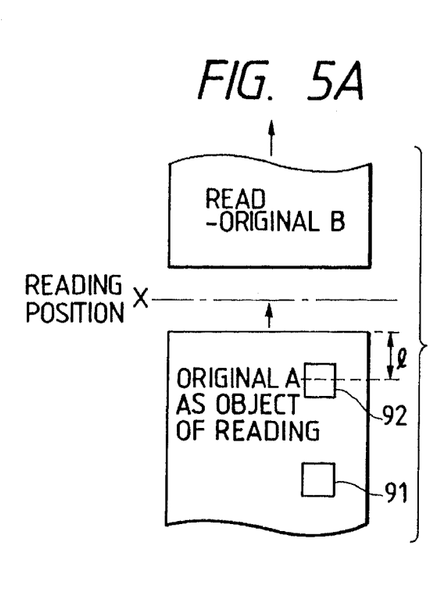
FIGS. 5A to 5C are explanatory drawings showing a state of conveyance of an original document.
Figure 5B:
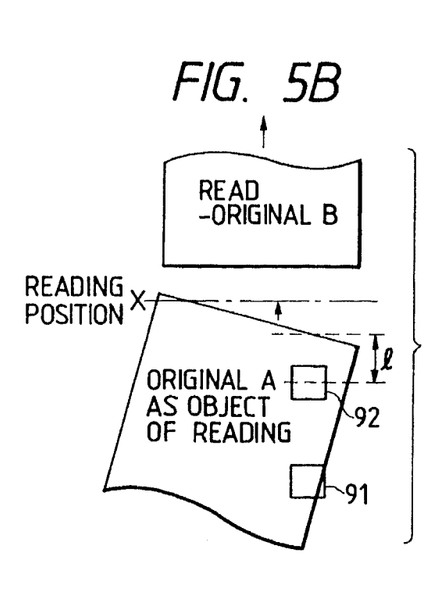
Figure 5C:
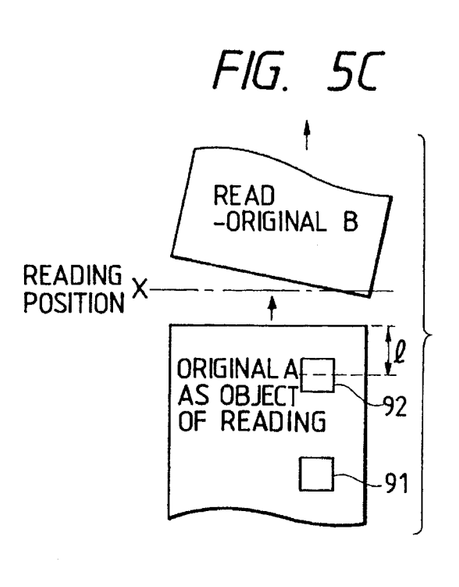

As shown in FIGS. 5A to 5C, position sensors 91 and 92 comprising microswitches 5 and 7 are provided near a reading position x for an original. The position sensor 91 detects the end of an original as an object of reading to make sure that the original has been inserted at an original stand-by position. The position sensor 92 detects the presence of an original to be conveyed for reading.

A series of operations to read an original image will be described referring to the flow chart in FIG. 4.

A procedure from step S1 to step S6 in FIG. 4 is the operation from the time the apparatus main body is powered on until a stand-by state is reached. Since the shading correction data in the RAM 33 is uncertain at this time, shading correction data is sampled as an initialization operation.

Step S1 . . . Turn on the power to light the light source.

Step S2 . . . Use the position sensor 92 (See FIG. 5A) to determine whether or not the original remains at the reading position.

Step S3 . . . If it has been determined in the abovementioned step S2 that there exists an original at the reading position, exhaust, or discharge, all originals which have been inserted so far to ensure that there is no original at the reading position.

Step S4 . . . Sample a data for shading correction, and store in the shading area (See FIG. 3) in RAM 33.

Step S5 . . . Put out the light source to put the apparatus in a stand-by state.

Step S6 . . . Continue to watch the position sensor 91 until the original is inserted.

Step S7 to step S10 shows a procedure after it is recognized in step S6 that the original has been inserted into the apparatus by the operator, and performs the control process until the first page of the original is read.

Step S7 . . . Discriminate whether or not the original inserted by the operator has already reached the position sensor 92. If the original has already reached the position sensor 92, do not execute the following steps S8 and S9, but proceed to step S10 because it is not known how far the front end of this original has been inserted.

Step S8 . . . Light the light source, sample a shading correction data to read the first page, store the shading correction data in a shading area of the RAM 33.

Step S9 . . . Convey the original to the reading position.

Step S10 . . . Continue the stand-by state until a reading start instruction from the console 80 is given by the operator or a reading start instruction is input from the CPU 32.

In steps S11 to S17, continuous conveyance of a plurality of originals placed on the original loading stand 2 by an automatic original feeding mechanism and continuous reading of plural pages are controlled. Especially, the CPU 32, which executes steps S14 and S15, functions as determination means 200 and control means 300 as shown in FIG. 2.

Step S11 . . . Read one page of the original while conveying the original already present at the reading position. At this time, correct an original image data from CCD 18 in a correction circuit 60 using a shading correction data in a shading area of the RAM 33. The completed reading is recognized by reading and conveying a specified amount after the rear end of the original has passed the position sensor 92.

Step S12 . . . Determine whether or not the next original exists by the position sensor 91, and if it has been determined that there exists the next original, proceed to step S13.

Step S13 . . . After the front end of the next original passed the position sensor 92, convey it to a position at a distance of 1 (shorter than a distance to the reading position, See FIG. 5A) so that the front end of the original is located midway between the position sensor 92 and the reading position. At this time, the previously read original is exhausted only by the same distance as for conveyance of the next original.

Step S14 . . . In a state in which there is neither a previous original nor a next original at the reading position as a result of the process in the above step S13, read a white background image for one line for shading correction, and store the read data in the test area in the RAM 33. In this example, a reference plane 11 with an uniform density located opposed to the reading position will be read.

Step S15 . . . Count an amount of black pixels included in binary data for one line, which has been read in the above step S14 and stored in the test area of the RAM 33, and determine whether or not the amount is more than a specified amount. If it is a data obtained by reading the above reference plane 11, it is of such an extent as to be a very small amount of dust on the reading surface that becomes black pixels. If, however, the end of the original is located at the reading position after the original has been conveyed at an angle as shown in FIGS. 5B and 5C, the amount of black pixels increases because of a shade, etc. of the original or the end. Accordingly, if it has been determined that the amount of black pixels is less than a specified value, it will be assumed that there is no original at the reading position, but it is possible to read the entire area of the reference plane 11. On the other hand, if it has been determined that the amount of black pixels is more than the specified value, it will be assumed that there is an original and it is impossible to read the entire area of the reference plane 11.

Step S16 . . . If it has been determined in step S15 that the amount of black pixels within the test area of RAM 33 is less than a specified value, read the reference plane 11 for shading correction, sample a read wave form and store it in the shading area of RAM 33 in step S16. On the other hand, if it has been determined in step S15 that the amount of black pixels is more than the specified value, do not execute the above S16, but proceed to step S17. Accordingly, when there is already an original at the reading position, storage of a shading correction data in the shading area of RAM 33 is not updated, but the shading correction data used for shading correction for the previous original will be held.

Step S17 . . . Convey the next original to the reading position in preparation for the next reading, and return to step S11 again. When the next original goes at an angle as shown in FIG. 5B and even when the previous original goes at an angle as shown in FIG. 5C, read the next original if the original goes at an angle to such a grade or degree that any original jam and omitted reading do not occur.

Step S18 to step S20 are a portion in which a process after the final original has been read is performed.

Step S18 . . . If it has been determined in step S12 that the next original does not exist, completely exhaust the final original.

Step S19 . . . In preparation for the next reading, sample the shading correction data, and store it in the shading area of RAM 33.

Step S20 . . . Put out the light source, and return to the step S6 in a stand-by state.

Execute the above processes, and obtain the read data for shading if it is possible to read the reference plane 11 during conveyance between the original and the next original.

Figure 6A:
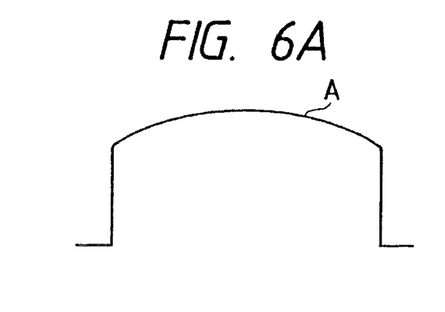
FIGS. 6A to 6C are wave form charts showing a signal wave form of an image data obtained by coping with a state of conveyance of an original document in FIGS. 5A to 5C.

Summarizing these operations, if both a read-original A and an original B as object of reading are conveyed straight as shown in FIG. 5A, there will be no original at the reading position, but such a wave form without black pixel data as shown in FIG. 6A will be obtained as a white background image data for the reference plane 11.

Figure 6B:
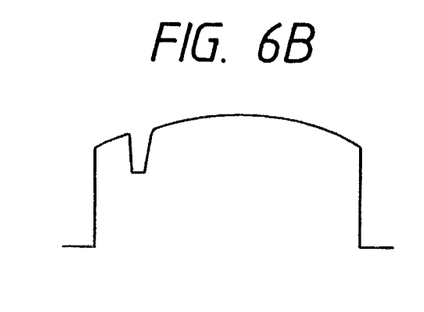

If, however, an original A as object of reading is at an angle as shown in FIG. 5B, the left end of the original A reaches the reading position x, and in a read wave form (See FIG. 6B) for the reference plane 11, a dent of a black pixel area occurs in an area with the texture color of the original A and the original shady area.

Figure 6C:
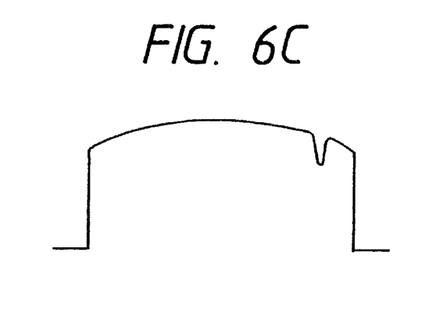

FIG. 5C shows when a read-original B has been conveyed at an angle, and a dent of a black pixel area also occurs in the read wave form as shown in FIG. 6C.

According to an embodiment of the present invention, taking notice of a fact that the read data for shading has no black pixel data when the original has been normally conveyed, when the states of conveyance in FIGS. 5B and 5C have been detected from the abnormality in the above read data, do not use this data for shading correction, but use the previously obtained read data as the shading correction data.

To detect conveyance of an original at an angle, the presence of more than a specified amount of black pixels is made a condition and not the presence of a black pixel. This is because a very small amount of dust, etc. are likely to exist at a reading position and mistaking the end of an original for these should be prevented.

In addition to this embodiment, the following examples are cited.

In the process in the step S15 in FIG. 4 according to an embodiment of the present invention, to stop sampling of a shading correction data, it was made a condition that a number of black pixels in one line reaches a specified amount. If, however, a number of times for occurrence of continuous black pixels in a specified amount is set in addition to this condition, the effect of dust such as minute paper powder on a reading surface may be further reduced.

The above determination condition was applied to a read data for one line, but as another method, there is also a method whereby one line is first read, further another line is read after conveying the original by one line hereafter, and the difference in a number of pixels in read data between these two lines is calculated. In this method, an erroneous determination due to dust, etc. on the above reading surface can be avoided because only the state of the original has changed between the first and second lines.

Also the above determination was made on the basis of the number of black pixels in the read data for one line, but it may be made depending upon whether or not the number of white pixels is more than a specified value on the contrary.

As described above, even if a read image data for shading correction is deteriorated due to improper conveyance of an original, etc., the data will not be used, and therefore a read image data from the original will not be corrected using the erroneous correction data, and not deteriorated.

The present invention has been described referring to preferred embodiments above, and is not limited to these embodiments, but can, of course, be applied by modification in various ways within the scope of the claims.

I claim:

1. An image reading apparatus, comprising:

a reference member provided at a reading position within said image reading apparatus;

reading means for reading, at the reading position, an image of at least one of (i) an original document and (ii) said reference member, and for generating image data representative of the read image;

memory means for previously storing as reference data, data obtained by reading said reference member with said reading means;

shading correcting means for performing shading correction of original image data, obtained by reading the original document with said reading means, using the reference data previously stored in said memory means;

discriminating means for discriminating whether the original document is present at the reading position by comparing the image data, which is obtained by reading the image at the reading position with said reading means, with the reference data previously stored in said memory means; and control means for controlling said memory means to store said read image data as a new reference data to replace the reference data previously stored in said memory means, when said discriminating means discriminates that the original document is not present at the reading position.

2. An apparatus according to claim 1, wherein said control means inhibits said memory means from storing said read image data as a new reference data to replace the reference data previously stored in said memory means, when said discriminating means discriminates that the original document is present at the reading position.

3. An apparatus according to claim 1, wherein said discriminating means performs the discrimination operation based on an amount of a specific type of data included in said read image data.

4. An apparatus according to claim 3, wherein the specific type of data comprises image data representing a black image.

5. An apparatus according to claim 1, further comprising feeding means for feeding the original document to the reading position.

6. An apparatus according to claim 1, further comprising detecting means for detecting a position of the original document, wherein said reading means reads said reference member, when said detecting means detects that the original document is not present at the reading position.

7. An image reading apparatus, comprising:

a reference member provided at a reading position within said image reading apparatus;

reading means for reading, at the reading position, an image of at least one of (i) an original document and (ii) said reference member, and for generating data representative of the read image;

feeding means for feeding a plurality of original documents to the reading position, one by one;

memory means for previously storing as reference data, data obtained by reading said reference member with said reading means, after a completion of reading a preceding original document and before a start of reading a current original document;

shading correcting means for performing shading correction for original image data, obtained by reading any one of the plurality of original documents with said reading means, using the reference data previously stored in said memory means;

discriminating means for discriminating whether the current original document is present at the reading position by comparing the read image data, which is obtained by reading the image at the reading position with said reading means, with the reference data previously stored in said memory means; and control means for controlling said memory means to store said read image data as a new data, to replace the reference data previously stored in said memory means, when said discriminating means discriminates that none of the plurality of original documents are present at the reading position.

8. An apparatus according to claim 7, wherein said control means inhibits said memory means from storing said read image data as a new reference data to replace the reference data previously stored in said memory means, when said discriminating means discriminates that any one of the plurality of original documents is present at the reading position.

9. An apparatus according to claim 7, wherein said discriminating means performs the discrimination operation based on an amount of a specific type of data included in said read image data.

10. An apparatus according to claim 9, wherein the specific type of data comprises image data representing a black image.

11. An apparatus according to claim 7, further comprising detecting means for detecting a position of the original document, wherein said reading means reads said reference member, when said detecting means detects that none of the plurality of original documents are present at the reading position.

12. An image reading apparatus, comprising:

a reference member provided at a reading position within said image reading apparatus;

reading means for reading, at the reading position, an image of at least one of (i) an original document and (ii) said reference member and for generating image data representative of the read image;

memory means for previously storing as reference data, data obtained by reading said reference member with said reading means;

shading correction means for performing shading correction for original image data, obtained by reading an original document with said reading means, using the reference data previously stored in said memory means;

discriminating means for discriminating that the original document is present at the reading position when an amount of a specific type of data included in the read image data, which is obtained by reading the image at the reading position with said reading means is greater than a predetermined amount by comparing said read image data with the reference data previously stored in said memory means; and control means for controlling said memory means to store said read image data as a new reference data to replace the previously stored reference data, when said discriminating means discriminates that the original document is not present at the reading position.

13. An apparatus according to claim 12, wherein the specific type of data comprises image data representing a black image.

14. An apparatus according to claim 13, wherein said control means inhibits said memory means from storing said read image data as a new reference data to replace the reference data previously stored in said memory means, when said discriminating means discriminates that the amount of the specific type of data is greater than the predetermined amount.

15. An apparatus according to claim 12, further comprising feeding means for feeding the original document to the reading position.

16. An apparatus according to claim 12, further comprising detecting means for detecting a position of the original document, wherein said reading means reads said reference member, when said detecting means detects that the original document is not present at the reading position.

17. An image reading apparatus, comprising:

a reference member provided at a reading position within said image reading apparatus;

reading means for reading, at the reading position, an image of at least one of (i) an original document and (ii) said reference member, and for generating image data representative of the read image;

memory means for previously storing as reference data, data obtained by reading said reference member with said reading means;

shading correction means for performing shading correction for original image data, obtained by reading the original document with said reading means, using the reference data previously stored in said memory means; and discriminating means for discriminating whether the original document is present at the reading position by comparing the read image data, which is obtained by reading the image at the reading position with said reading means, with the reference data previously stored in said memory means.

18. An apparatus according to claim 17, further comprising control means for controlling said memory means to store said read image data as a new reference data to replace the reference data previously stored in said memory means, when said discriminating means discriminates that the original document is not present at the reading position.

19. An apparatus according to claim 17, further comprising control means for inhibiting said memory means from storing said read image data as a new reference data to replace the reference data previously stored in said memory means, when said discriminating means discriminates that the original document is present at the reading position.

20. An apparatus according to claim 17 wherein said discriminating means performs the discrimination operation based on an amount of a specific type of data included in said read image data.

21. An apparatus according to claim 20, wherein the specific type of data comprises image data representing a black image.

22. An apparatus according to claim 17, further comprising feeding means for feeding the original document to the reading position.

23. An apparatus according to claim 17, further comprising detecting means for detecting a position of the original document, wherein said reading means reads said reference member, when said detecting means detects that the original document is not present at the reading position.

24. An image reading apparatus, comprising:

a reference member provided at a reading position within said image reading apparatus;

reading means for reading, at the reading position, an image of at least one of (i) an original document and (ii) said reference member, and for generating image data representative of the read image;

feeding means for feeding a plurality of original documents to the reading position, one by one;

memory means for previously storing as reference data, data obtained by reading said reference member with said reading means, after completion of reading a preceding original document and before a start of reading a current original document;

shading correction means for performing shading correction for original image data, obtained by reading any one of the plurality of original documents with said reading means with said reading means, using the reference data previously stored in said memory means; and discriminating means for discriminating whether the current original document is present at the reading position by comparing the read image reference data, which is obtained by reading the image at the reading position with said reading means, with the reference data previously stored in said memory means.

25. An apparatus according to claim 24, further comprising control means for controlling said memory means to store said read image data as a new reference data to replace the reference data previously stored in said memory means, when said discriminating means discriminates that none of the plurality of original documents are present at the reading position.

26. An apparatus according to claim 24, further comprising control means for inhibiting said memory means from storing said read image data as a new reference data to replace the reference data previously stored in said memory means, when said discriminating means discriminates that any one of the plurality of original documents is present at the reading position.

27. An apparatus according to claim 24, wherein said discriminating means performs the discrimination operation based on an amount of a specific type of data included in said read image data.

28. An apparatus according to claim 27, wherein the specific type of data comprises image data representing a black image.

29. An apparatus according to claim 24, further comprising detecting means for detecting a position of the original document, wherein said reading means reads said reference member, when said detecting means detects that none of the plurality of the original documents are present at the reading position.

30. An image reading apparatus, comprising:

a reference member provided at a reading position within said image reading apparatus;

reading means for reading, at the reading position, an image of at least one of (i) an original document and (ii) said reference member, and for generating image data representative of the read image;

memory means for previously storing as reference data, data obtained by reading said reference member with said reading means;

shading correction means for performing shading correction for original image data, obtained by reading the original document with said reading means, using the reference data previously stored in said memory means; and discriminating means for discriminating that the original document is present at the reading position when an amount of a specific type of data included in the read image data, which is obtained by reading the image at the reading position with said reading means, is greater than a predetermined amount by comparing said read image data with the reference data previously stored in said memory means.

31. An apparatus according to claim 30, further comprising control means for controlling said memory means to store said read image data as a new reference data to replace the reference data previously stored in said memory means, when said discriminating means discriminates that the original document is not present at the reading position.

32. An apparatus according to claim 30, wherein the specific type of data comprises image data representing a black image.

33. An apparatus according to claim 30, further comprising control means for inhibiting said memory means from storing said read image data as a new reference data to replace the reference data previously stored in said memory means, when said discriminating means discriminates that the amount of the specific type of data is greater than the predetermined amount.

34. An apparatus according to claim 30, further comprising feeding means for feeding the original document to the reading position.

35. An apparatus according to claim 30, further comprising detecting means for detecting a position of the original document, wherein said reading means reads said reference member, when said detecting means detects that the original document is not present at the reading position.

36. An image reading method comprising the steps of:

reading, at a reading position, an image of at least one of (i) an original document and (ii) a reference member provided at the reading position, and for generating image data representative of the read image;

previously storing as reference data, data obtained by reading said reference member in said reading step;

performing shading correction for original image data, obtained by reading the original document in said reading step, using the reference data previously stored in said storing step;

discriminating whether the original document is present at the reading position by comparing the read image data, which is obtained by reading the image at the reading position in said reading step, with the reference data previously stored in said storing step; and newly storing said read image data as a new reference data to replace the reference data previously stored in said previously storing step, when it is discriminated in said discriminating step that the original document is not present at the reading position.

37. An image reading method comprising the steps of:

reading, at a reading position, an image of at least one of (i) an original document and (ii) a reference member provided at the reading position, and for generating data representative of the read image;

previously storing as reference data, data obtained by reading said reference member in said reading step;

performing shading correction for original image data, obtained by reading the original document in said reading step, using the reference data previously stored in said storing step; and discriminating whether the original document is present at the reading position by comparing the read image data, which is obtained by reading the image at the reading position in said reading step, with the reference data previously stored in said storing step.

* * * * *

UNITED STATES PATENT AND TRADEMARK OFFICE
CERTIFICATE OF CORRECTION

PATENT NO. : 5,455,690
DATED : October 3, 1995
INVENTOR(S) : Yuji Ishikawa

It is certified that error appears in the above-indentified patent and that said Letters Patent is hereby corrected as shown below:

COLUMN 2

Line 16, "necessity" should read --the necessity--.
    Line 64, "An" should read --A--.

COLUMN 3

Line 3, "round" should read --around--.
    Line 37, "exits" should read --exit--.

COLUMN 4

Line 48, "is a ROM is" should read --in a ROM 34 is a--.

COLUMN 5

Line 15, "discharge," should read --discharge--.
    Line 68, "exhausted" should read --discharged--.

COLUMN 8

Line 9, "image" should read --read image--.

COLUMN 9

Line 1, "data," should read --reference data,--.

COLUMN 10

Line 38, "claim 17" should read --claim 17,--.

UNITED STATES PATENT AND TRADEMARK OFFICE
CERTIFICATE OF CORRECTION

PATENT NO. : 5,455,690

DATED : October 3, 1995

INVENTOR(S) : YUJI ISHIKAWA

It is certified that error appears in the above-indentified patent and that said Letters Patent is hereby corrected as shown below:

<u>COLUMN 11</u>

Line 4, "means with said reading" should be deleted.
Line 9, "reference" should be deleted.
Line 22, "data" (second occurrence) should read --data,--.

Signed and Sealed this

Fifth Day of March, 1996

Attest:

BRUCE LEHMAN

*Attesting Officer*     *Commissioner of Patents and Trademarks*